US011525519B2

(12) United States Patent
Gramss et al.

(10) Patent No.: US 11,525,519 B2
(45) Date of Patent: Dec. 13, 2022

(54) COOLANT VALVE FOR A VEHICLE (71) Applicant: ILLINOIS TOOL WORKS INC., Glenview, IL (US)

(72) Inventors: Rainer Gramss, Buchholz (DE); Torsten Hauk, Neustadt (DE)

(73) Assignee: ILLINOIS TOOL WORKS INC., Glenview, IL (US)

(*) Notice: Subject to any disclaimer, the term of this patent is extended or adjusted under 35 U.S.C. 154(b) by 0 days.

(21) Appl. No.: 17/259,827

(22) PCT Filed: Jul. 11, 2019

(86) PCT No.: PCT/US2019/041339
§ 371 (c)(1),
(2) Date: Jan. 12, 2021

(87) PCT Pub. No.: WO2020/018340
PCT Pub. Date: Jan. 23, 2020

(65) Prior Publication Data
US 2021/0222778 A1 Jul. 22, 2021

(30) Foreign Application Priority Data

Jul. 17, 2018 (DE) ...................... 10 2018 117 240.0

(51) Int. Cl.
*F16K 5/06* (2006.01)
*F01P 7/14* (2006.01)
*F16K 5/20* (2006.01)

(52) U.S. Cl.
CPC .............. *F16K 5/0678* (2013.01); *F01P 7/14* (2013.01); *F16K 5/208* (2013.01); *F01P 2007/146* (2013.01)

(58) Field of Classification Search
CPC . F16K 5/0678; F16K 5/208; F01P 7/14; F01P 2007/146

(Continued)

(56) References Cited

U.S. PATENT DOCUMENTS 2,373,628 A 4/1945 Gleeson
3,082,992 A 3/1963 Herbert
(Continued)

FOREIGN PATENT DOCUMENTS

CN 1425112 A 5/2001
CN 102483166 A 5/2012
(Continued)

OTHER PUBLICATIONS

PCT, International Search Report and Written Opinion, International Application No. PCT/US2019/041339; dated Sep. 25, 2019, 10 pages.

*Primary Examiner* — John Bastianelli
(74) *Attorney, Agent, or Firm* — Thompson Hine LLP (57) ABSTRACT

Coolant valve for a vehicle includes a housing having a plurality of coolant ports, a valve element arranged in an adjustable manner in the housing in order to connect or disconnect coolant ports, and at least one seal arrangement. The seal arrangement bears in a sealing manner against the housing on one side and in a sealing manner against the valve element on the other side, the seal arrangement having a carrier element made of a first material and a sealing element made of a second material, the second material being softer than the first material. The sealing element has a first sealing lip bearing against the valve element and the carrier element having a supporting portion. The first sealing lip protrudes beyond the supporting portion with a free end, and the first sealing lip is pressed against the supporting portion when coolant flows through the coolant valve.

9 Claims, 5 Drawing Sheets (58) Field of Classification Search
 USPC .............................................. 251/304–317.1
 See application file for complete search history.

(56) References Cited

U.S. PATENT DOCUMENTS

| | | | | |
|---|---|---|---|---|
| 3,460,802 | A | * | 8/1969 | Colby ................... F16K 27/107 251/172 |
| 3,841,347 | A | | 10/1974 | Kushida |
| 4,815,700 | A | | 3/1989 | Mohrfeld |
| 4,883,253 | A | | 11/1989 | Hashimoto |
| 2004/0036052 | A1 | | 2/2004 | Nowak |
| 2004/0159819 | A1 | | 8/2004 | Hotton |
| 2005/0072953 | A1 | | 4/2005 | Caprera |
| 2009/0114169 | A1 | | 5/2009 | Heldberg |
| 2009/0250525 | A1 | | 10/2009 | Habennann |
| 2014/0199933 | A1 | * | 7/2014 | Wissmueller ......... F16K 31/041 454/162 |
| 2015/0123023 | A1 | * | 5/2015 | Heldberg .................. F16K 5/08 251/315.1 |

FOREIGN PATENT DOCUMENTS

| | | | |
|---|---|---|---|
| CN | 108119666 | A | 6/2018 |
| EP | 1391644 | | 2/2004 |
| EP | 2052177 | | 6/2011 |
| FR | 1294875 | | 6/1962 |
| GB | 2007334 | | 5/1979 |
| GB | 2065276 | | 6/1981 |

* cited by examiner

COOLANT VALVE FOR A VEHICLE

TECHNICAL FIELD

The invention relates to a coolant valve for a vehicle, comprising a housing having a plurality of coolant ports, and a valve element arranged in an adjustable manner in the housing in order to connect or disconnect coolant ports, and at least one seal arrangement arranged in the region of at least one coolant port, said seal arrangement bearing in a sealing manner against the housing on one side and in a sealing manner against the valve element on the other side.

BACKGROUND

Coolant valves of the above-mentioned type are used in coolant circuits of vehicles, such as cars or trucks. They serve, for example, for cooling an internal combustion engine. In a manner which is dependent on the position of the valve element, for example, cooling liquid is guided past a radiator via a bypass line during a warm-up phase of the internal combustion engine, and is guided through the radiator after the operating temperature is reached. It is also possible in the case of coolant valves, in a manner which is dependent on the application, that coolant flows only temporarily through the coolant valve, for example when the coolant flow is interrupted completely in the cold starting phase of an internal combustion engine. The valve element can be controlled automatically, for example via expansion elements. Electric drives for adjusting the valve element which are actuated by a control device are also possible, however.

Annular seal arrangements are provided, for example, for sealing the coolant ports with respect to the valve element, which seal arrangements bear in a sealing manner against the housing, in particular the housing portion which delimits the coolant port, on one side, and in a sealing manner against the valve element on the other side.

A coolant valve having a seal arrangement of this type is known, for example, from EP 2 052 177 B1. The thermostat valve which is described therein has a spherical-shell-shaped valve element, the seal arrangement having a sliding ring which is made of slippery solid plastic and is prestressed against the valve element by an elastomeric sealing ring. The sliding ring can consist, for example, of PTFE (polytetrafluoroethylene), and the elastomeric sealing ring can consist of EPDM (ethylene propylene diene monomer rubber). A sealing action which is reliable at all times can be achieved by way of the known thermostat valve. Not inconsiderable costs are associated with the known seal arrangement, however.

One problem of known seal arrangements of coolant valves lies in the fact that there is a conflict of objectives between firstly reliable bearing of the seal arrangement against the valve element and therefore a reliable sealing action even in the case of a low system pressure, and secondly a high load-bearing capability and low yielding at a high pressure in the case of low frictional torques and therefore low drive torques for the valve element.

SUMMARY

Proceeding from the described prior art, the invention is based on the object of providing a coolant valve of the type mentioned at the outset which resolves the above-described conflict of objectives as satisfactorily as possible with inexpensive manufacture.

The invention achieves the object by way of the subject matter of claim 1. Advantageous refinements are found in the dependent claims, the description and the figures.

For a coolant valve of the type mentioned at the outset, the invention solves the object by virtue of the fact that the seal arrangement has a carrier element made of a first material and a sealing element made of a second material, the second material being softer than the first material, and that the sealing element has a first sealing lip bearing against the valve element and the carrier element has a supporting portion, the first sealing lip protruding beyond the supporting portion with a free end, and the first sealing lip being pressed against the supporting portion when coolant flows through the coolant valve.

The coolant valve is provided for a vehicle, such as a car or truck. The coolant valve can be arranged in a cooling circuit of a vehicle with an internal combustion engine or an electric motor or a hybrid vehicle. It can be provided, for example, for cooling an internal combustion engine or the batteries of an electric vehicle. The coolant valve can be a thermostat valve. In order to adjust the valve element, an electric drive can be provided which is actuated by a control device of the vehicle. It is also possible, however, that a temperature-dependent control element is provided, such as an expansion element, which changes its length in a manner which is dependent on the temperature and adjusts the valve element as a result. The housing of the coolant valve has two or more than two coolant ports which can be connected, for example, to coolant lines of a cooling circuit of a vehicle. By way of adjustment of the valve element, for example, two coolant ports can be connected to one another or can be disconnected from one another. If, for example, the housing has three coolant ports, coolant which is fed via one of the coolant ports, for example, can be fed either to a first or a second of the two other coolant ports by way of adjustment of the valve element. The two further coolant ports can be connected, for example, to a radiator firstly and to a bypass line for bypassing the radiator secondly. It is also possible that no coolant flows through the cooling circuit and therefore through the coolant valve temporarily during operation of the coolant valve, for example during a cold starting phase of an internal combustion engine. In particular, a cooling liquid, such as cooling water, can come into question as coolant. In a manner known per se, at least one seal arrangement is provided which bears in a sealing manner against the valve element on one side and in a sealing manner against the housing, in particular a housing portion which delimits a coolant port, on the other side. A corresponding seal arrangement can be provided, in particular, at each of the coolant ports, with the result that the number of seal arrangements can correspond to the number of coolant ports of the housing.

According to the invention, the seal arrangement has a carrier element made of a first material and a sealing element made of a second material, the second material being softer than the first material. The sealing element has an elastic first sealing lip which bears against the valve element and along which the valve element slides during an adjustment, with the result that a reliable sealing action with respect to the valve element is ensured at all times. Moreover, the carrier element has a supporting portion, beyond which the first sealing lip protrudes with a free end, in particular in the radial direction, in particular toward the inside. In the case of coolant flow through the coolant valve, the first sealing lip is pressed onto the supporting portion by way of the system pressure which is produced in the coolant valve. In the case of pressure application on account of a coolant flow through the coolant valve, the first sealing lip therefore bears against the supporting portion in one direction. The flow direction of the coolant through the coolant valve and therefore the direction of the pressure application is fixed in the state, in which said coolant valve is installed into a cooling circuit. The first sealing lip, in particular its region which is pressed onto the supporting portion, is not connected fixedly to the supporting portion, in particular. The first sealing lip can therefore be detached from the supporting portion or can lift from the latter in a direction opposite to the direction which presses the first sealing lip onto the supporting portion.

As a result of the seal arrangement according to the invention, in the case of low pressure application or no pressure application on account of the first sealing lip possibly lifting from the supporting portion, a great active length of the first sealing lip is provided, since substantially the entire first sealing lip, in particular also the part which is pressed onto the supporting portion in the case of pressure application, is available as an elastic seal element. Therefore, a reliable sealing action is achieved with largely force-free bearing of the first sealing lip against the valve element and therefore low adjusting torques in the case of an adjustment of the valve element. In the case of a low system pressure, the first sealing lip which is long in said direction ensures a sufficient seal force with simultaneously low frictional torques. As the system pressure increases in the case of coolant flow through the coolant valve, the frictional torques increase, the first sealing lip then being pressed onto the supporting portion. Therefore, a comparatively short active length of the first sealing lip is realized, since only that part of the first sealing lip which protrudes radially beyond the supporting portion is then available as elastic seal element. In contrast, the remaining part of the first sealing lip bears against the substantially inelastic supporting portion. This ensures that there is a high load-bearing capability even in the case of high pressure application, and the seal cannot yield in an undesired manner and seal problems cannot occur. At the same time, undesirably high frictional torques are avoided reliably by way of the small active length. The conflict of objectives described at the outset is therefore resolved. The energy requirement for adjusting the valve element is correspondingly likewise decreased. At the same time, the coolant valve according to the invention is of simple construction and can accordingly be manufactured inexpensively.

It goes without saying that a seal arrangement according to the invention can be provided, in particular, at each coolant port of the housing. As has already been mentioned, the sealing element consists of a softer material than the carrier element. The soft, elastic material of the sealing element ensures a satisfactory sealing action. The carrier element consists of a substantially inelastic harder material which accordingly provides a satisfactory supporting function for the first sealing lip. The sealing element and the carrier element can consist of plastic. A thermoplastic or thermoset is to be mentioned merely by way of example as one possible material for the sealing element. In turn, a thermoplastic with a high rigidity is to be mentioned merely by way of example as a possible material for the carrier element.

The first sealing lip can be lifted at least partially from the supporting portion when coolant is not flowing through the coolant valve. Here, it is deformed elastically with respect to its resting shape. There is substantially a force-free state in the coolant valve in the case of stationary coolant. An effective pre-pressing action and therefore a reliable sealing action are achieved by the first sealing lip being lifted up from the supporting portion in said state.

In accordance with a further refinement, the sealing element can have a second sealing lip bearing against the housing. Overall, a reliable sealing action is achieved between the housing and the valve element by way of the two sealing lips together. Here, the second sealing lip is preferably likewise part of the sealing element.

The supporting portion and the first sealing lip can each be configured in an annular manner, and/or the second sealing lip can be configured in an annular manner. The carrier element can be annular overall. The same applies to the sealing element. This refinement leads to a particularly reliable sealing action of the coolant ports.

In accordance with a further refinement, the ratio of the length of the free end of the sealing lip protruding beyond the supporting portion to the overall length of the sealing lip can be at most 0.4, preferably at most 0.3. Here, the length is viewed in the radial direction of the preferably annular first sealing lip. Said length ratios bring about a particularly effective reduction of the active length of the first sealing lip in the pressure application direction and, at the same time, particularly low-force contact by way of maximization of the active length counter to the pressure application direction.

The carrier element can have a latching portion, with which the carrier element is latched to the housing. For example, the latching portion can have at least one latching protrusion and/or at least one latching receptacle, and the housing can have at least one corresponding latching receptacle and/or at least one corresponding latching protrusion. A latching action of this type ensures firstly simple assembly and secondly secure retention. The latching protrusion and/or the latching receptacle can be annular. Moreover, the latching action reliably prevents it being possible for the carrier element or its supporting portion to come into contact with the valve element.

In accordance with a further refinement in this regard, the latching connection can have a clearance in the direction of pressure application when coolant flows through the coolant valve. As a result, an easy movability of the seal arrangement relative to the housing and/or to the valve element is achieved. This further simplifies the assembly.

In accordance with one particularly practical refinement, the valve element can be a spherical-shell-shaped valve element that is mounted in a rotatable manner in the housing. It can be, for example, a hemispherical-shell-shaped valve element. The valve element has one or more apertures for connecting the coolant ports to one another. For example, it can have bearing journals which lie opposite one another and via which the valve element is mounted pivotably in the housing. This is known per se.

In accordance with a further refinement, the seal arrangement can be produced in a two-component injection-molding process. Particularly simple and inexpensive manufacture is achieved as a result. As has been explained, there is no integrally joined or other fixed connection between the first sealing lip and the supporting portion at least in the region of the contact, in order that the first sealing lip can lift from the supporting portion as has been described. During the manufacture, the carrier element as a hard component and the sealing element as a soft component can be connected mechanically to one another by way of overflow channels. By way of a suitable material selection, chemical coupling of the two components can be ruled out, with the result that there is accordingly a connection only in a mechanical way as a result of the overflow channels.

The invention also relates to a cooling circuit of a vehicle, comprising a plurality of coolant lines and at least one coolant valve according to the invention, arranged in the cooling circuit, the coolant ports of said coolant valve being connected to the coolant lines.

Moreover, the invention relates to a vehicle, comprising a cooling circuit according to the invention with at least one coolant valve according to the invention. As has already been described, the vehicle can be, for example, a car or truck with an internal combustion engine and/or electric motor.

BRIEF DESCRIPTION OF THE DRAWINGS

Exemplary embodiments of the invention will be described in greater detail in the following text using figures, in which, diagrammatically.

Unless specified otherwise, identical designations denote identical objects in the figures.

DETAILED DESCRIPTION

Figure 1:
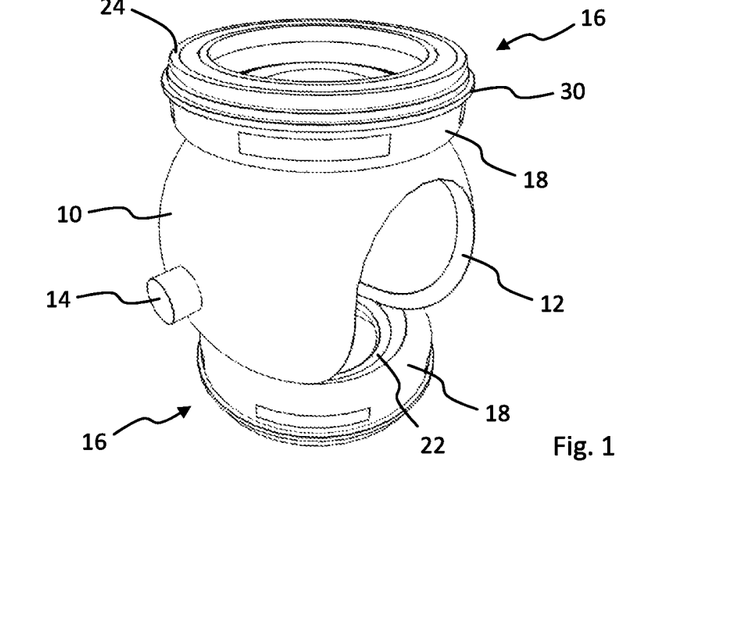
FIG. 1 shows a coolant valve according to the invention in accordance with a first exemplary embodiment in a perspective view.

The coolant valve which is shown in FIG. 1 has a valve element 10, a spherical-shell-shaped valve element 10 in the example which is shown. In the example which is shown, it has an aperture 12 and bearing journals 14 which are arranged on opposite sides and of which only one can be seen in FIG. 1. Via the bearing journals 14, the valve element 10 is mounted pivotably in a housing (not shown in greater detail in FIG. 1 for reasons of illustration). It can be pivoted, for example, by way of an electric drive, controlled by way of a control device. The coolant valve which is shown in FIG. 1 is installed in a cooling circuit of a vehicle, such as a car or truck with an internal combustion engine and/or electric motor. The housing has, for example, three coolant ports, it being possible, for example, for a coolant port which is connected to a coolant inflow to be connected to a first or a second of the two further coolant ports by way of pivoting of the valve element 10. At least the two further coolant ports are assigned in each case one seal arrangement 16. The seal arrangements 16 are of identical configuration and are arranged merely in a mirrored manner.

Figure 2:
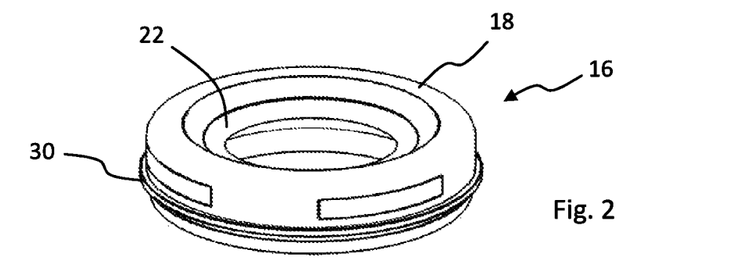
FIG. 2 shows a seal arrangement of the coolant valve which is shown in FIG. 1, in a perspective view.
Figure 3:
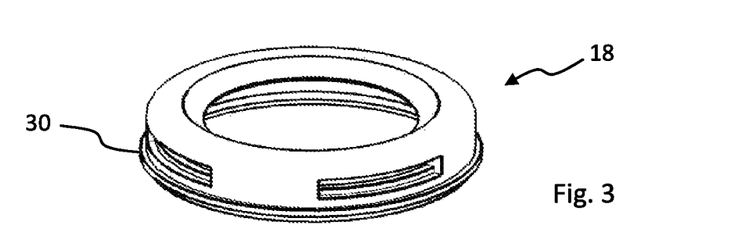
FIG. 3 shows a carrier element of the seal arrangement which is shown in FIG. 2, in a perspective view.
Figure 4:
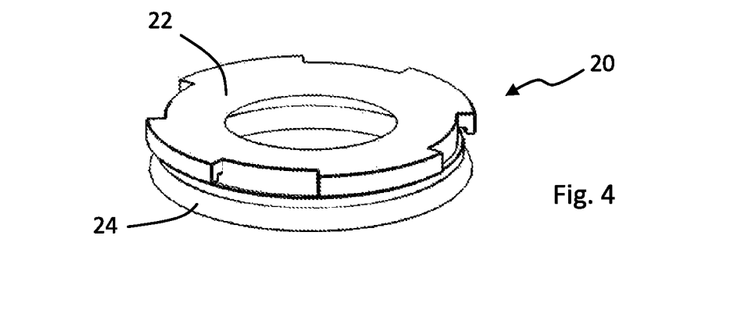
FIG. 4 shows a sealing element of the seal arrangement which is shown in FIG. 2, in a perspective view.

The construction of the seal arrangement 16 is to be described in greater detail using FIGS. 2 to 4. The seal arrangement 16 comprises an annular carrier element 18 (shown in FIG. 3) made of a first, substantially inelastic plastic, and a likewise annular sealing element 20 (shown in FIG. 4) made of a second, elastic plastic which is softer than the first plastic of the carrier element 18. The seal arrangement is produced in a two-component injection molding method, the carrier element 18 and the sealing element 20 being connected to one another exclusively mechanically by way of overflow channels. Chemical coupling between the carrier element 18 and the sealing element 20 is avoided by way of a suitable material selection. The sealing element 20 has a first sealing lip 22 which bears in a sealing manner against the valve element 10 in the assembled state. Moreover, the sealing element 20 has a second sealing lip 24 which, in the assembled state, bears against a portion of the housing of the coolant valve, which portion delimits the coolant port. The carrier element 18 has a supporting portion 26, against which the first sealing lip 22 can bear, as can be seen, in particular, in FIGS. 5 to 9, the first sealing lip 22 protruding radially to the inside beyond the supporting portion 26. Moreover, FIGS. 5 to 9 show a part of the housing of the coolant valve at the designation 28. As can be seen, in particular, in the enlarged illustrations of FIGS. 8 and 9, the carrier element 18 has, on its outer side, an annularly circumferential latching protrusion 30 which is received in a latching manner into a corresponding annular latching receptacle 32 of the housing 28.

The latching action prevents firstly that the supporting portion 26 can bear against the valve element 10. Moreover, the latching connection has a clearance 31 in the axial direction of the seal arrangement 16 (at the top and bottom in FIGS. 8 and 9), as can be seen on the basis of a comparison of the height of the latching protrusion 30 and the latching receptacle 32.

Figure 6:
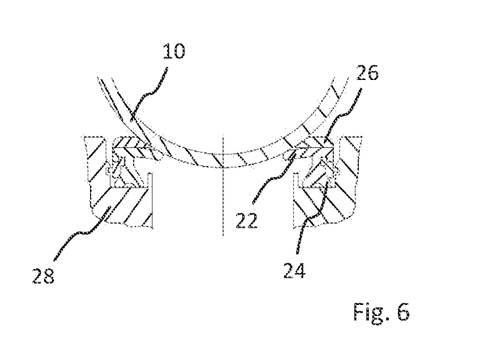
FIG. 6 shows the illustration from FIG. 5, with a valve element in one operating state.
Figure 7:
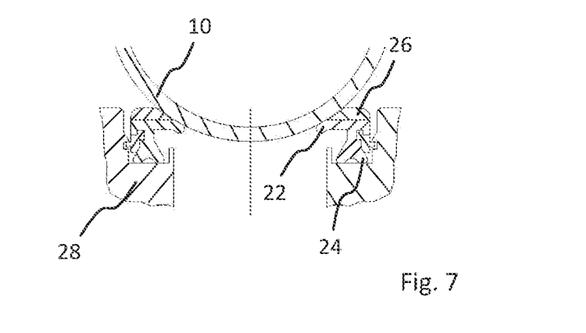
FIG. 7 shows the illustration from FIG. 6, in a second operating state.
Figure 8:
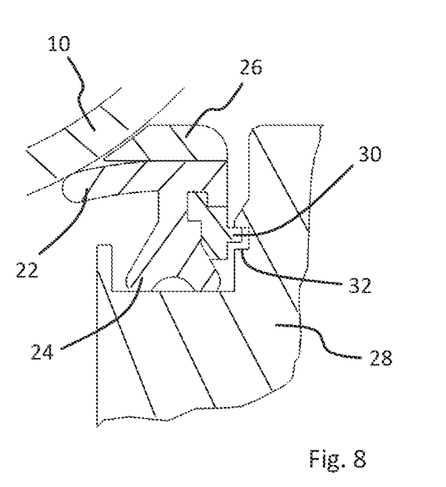
FIG. 8 shows a detail of an enlargement of the illustration from FIG. 6.
Figure 9:
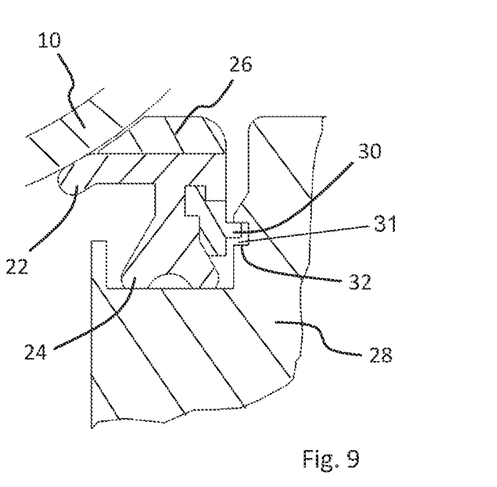
FIG. 9 shows a detail of an enlargement of the illustration from FIG. 7.

FIGS. 6 and 8 show the assembled state with a valve element 10, there being substantially no pressure application by way of coolant. In this state, the first sealing lip 22 is lifted from the supporting portion 26 with slight elastic deformation, and there is a large active length of the first sealing lip 22 for the sealing action. In the case of a coolant flow through the coolant valve and a corresponding pressure application (from the bottom to the top in FIGS. 6 to 9), in contrast, pressing of the first sealing lip 22 onto the supporting portion 26 occurs, with the result that only the relatively short radial overhang of the first sealing lip 22 beyond the supporting portion 26 is available as active length for the sealing action.

Figure 10:
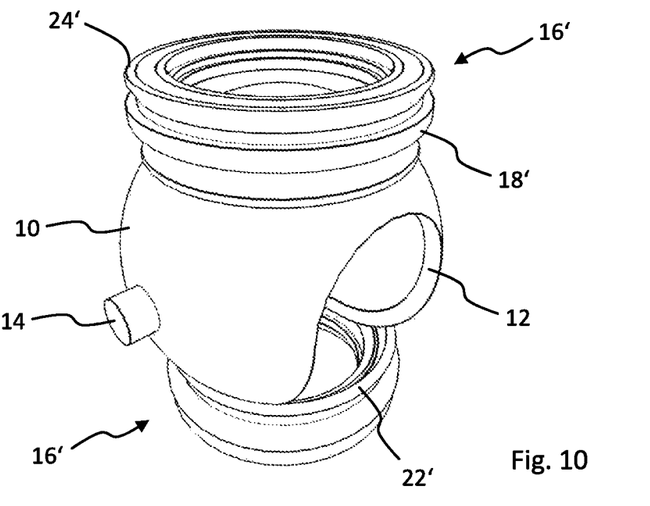
FIG. 10 shows a coolant valve according to the invention in accordance with a second exemplary embodiment in a perspective view.
Figure 11:
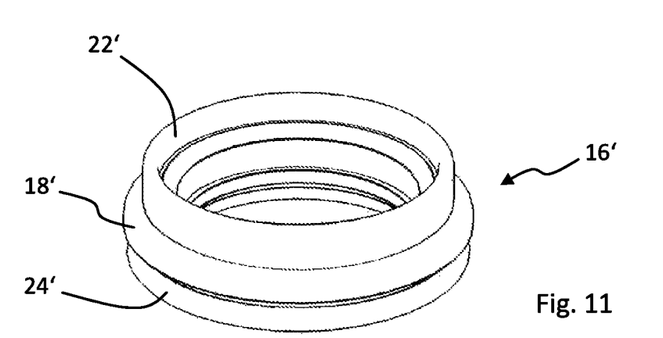
FIG. 11 shows a seal arrangement of the coolant valve which is shown in FIG. 10, in a perspective view.
Figure 12:
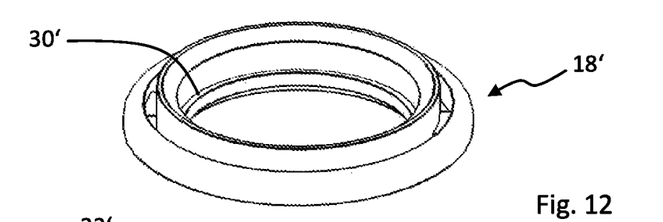
FIG. 12 shows a carrier element of the seal arrangement which is shown in FIG. 11, in a perspective view.
Figure 13:
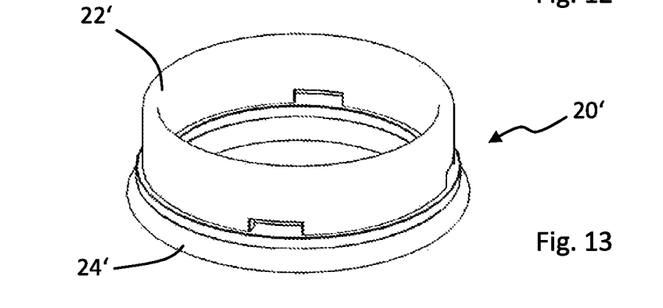
FIG. 13 shows a sealing element of the seal arrangement which is shown in FIG. 11, in a perspective view.
Figure 14:
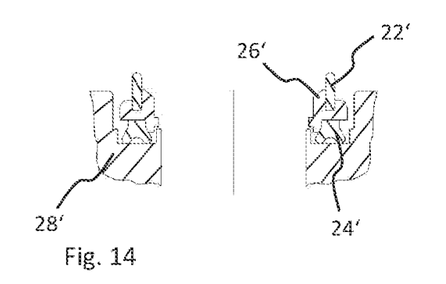
FIG. 14 shows a detail of a sectional illustration of the coolant valve which is shown in FIG. 10, without a valve element.
Figure 15:
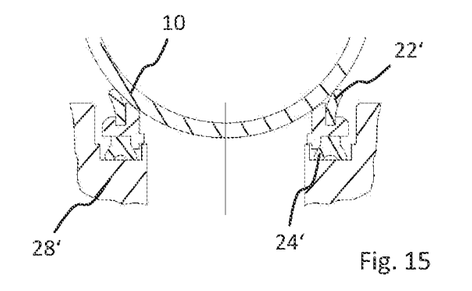
FIG. 15 shows the illustration from FIG. 14, with a valve element in a first operating state.
Figure 16:
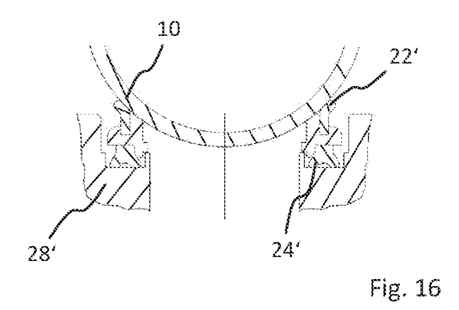
FIG. 16 shows the illustration from FIG. 15, in a second operating state.
Figure 17:
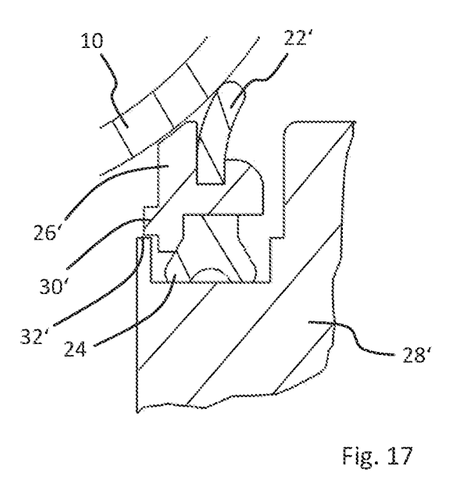
FIG. 17 shows a detail of an enlargement of the illustration from FIG. 15.
Figure 18:
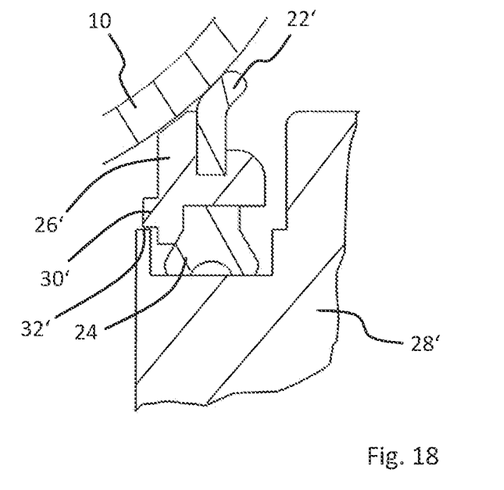
FIG. 18 shows a detail of an enlargement of the illustration from FIG. 16.

FIG. 10 shows a coolant valve according to the invention in accordance with a further exemplary embodiment. With regard to the configuration and function, it corresponds as far as possible to the coolant valve which is shown in FIG. 1. It differs merely with regard to the configuration of the seal arrangements 16'. As can be seen, in particular, in FIGS. 11 to 13, the seal arrangement 16' also has a carrier element 18' made of a substantially inelastic hard plastic, and a sealing element 20' made of a softer, elastic plastic. Once again, the seal arrangement 16' is manufactured using the two-component injection molding method and is connected to one another merely mechanically by way of corresponding overflow channels. The sealing element 20' once again has a first sealing lip 22' which bears against the valve element 10 in the assembled state, and a second sealing lip 24' which bears against the housing 28' of the coolant valve in the assembled state. It can be seen using the sectional illustrations of FIGS. 14 to 18 that the sealing function corresponds substantially to the sealing function which is described in respect of the first exemplary embodiment, the pressure application direction in the case of coolant flow through the coolant valve being different in this case, namely from right to left and from left to right in FIGS. 15 to 18. As can be seen in FIGS. 15 and 17, if no coolant flows through the coolant valve and there is a corresponding lack of pressure application, the first sealing lip 22' is once again lifted from the supporting portion 26' of the carrier element 18' with slight elastic deformation. There is therefore a large active length for the sealing action. In the case of pressure application (as shown in FIGS. 16 and 18), in contrast, the first sealing lip 22' is pressed onto the supporting portion 26' again, with the result that only a relatively short active length is available for the sealing action.

In the case of the second exemplary embodiment, the carrier element 18' has a latching protrusion 30' which runs around in an annular manner on its inner face and is once again received in a latching manner with some axial play into a corresponding annular latching receptacle 32' of the housing 28'.

Figure 5:
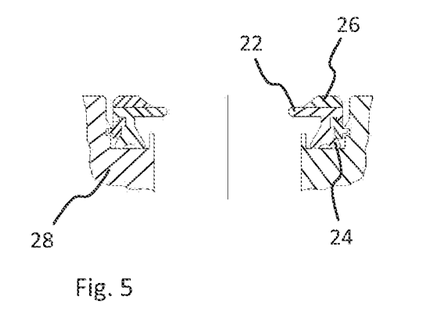
FIG. 5 shows a detail of a sectional illustration of the coolant valve which is shown in FIG. 1, without a valve element.
Figure 19:
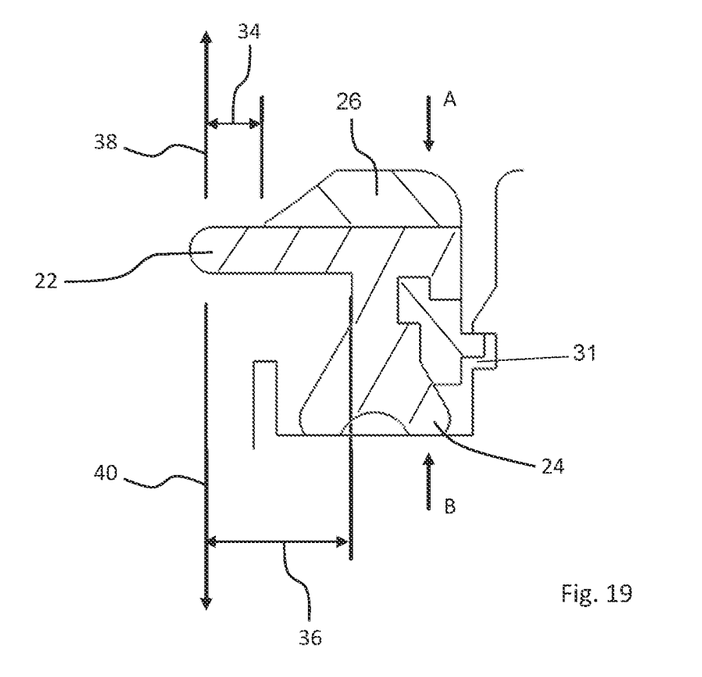
FIG. 19 shows a further detail of an enlargement of the illustration from FIG. 5.
Figure 20:
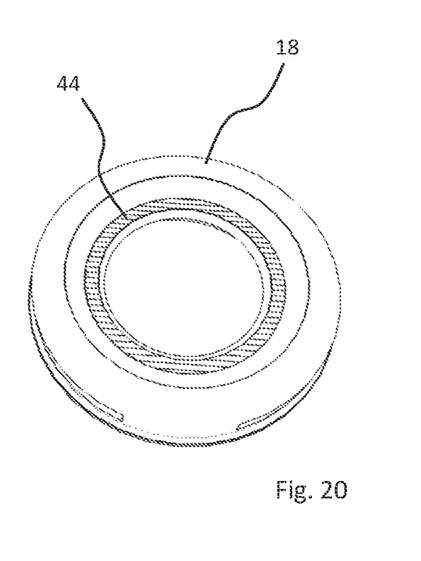
FIG. 20 shows a marked perspective view of the seal arrangement from FIG. 2 in the direction of arrow A in FIG. 2.
Figure 21:
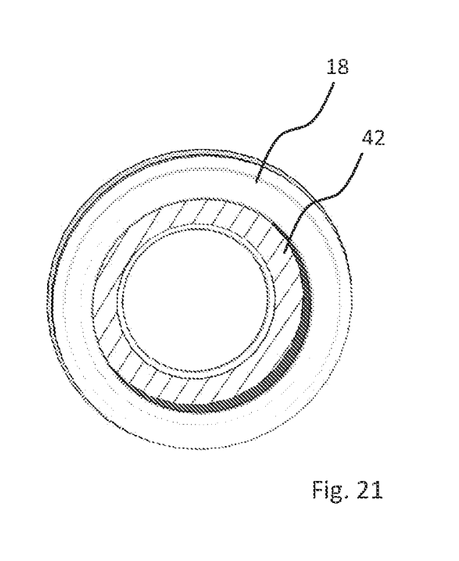
FIG. 21 shows a marked perspective view of the seal arrangement from FIG. 2 in the direction of arrow B in FIG. 2.

The length ratios of the first sealing lip 22 are to be illustrated on the basis of the enlarged illustration of FIG. 19 which to this extent corresponds to the right hand image detail of FIG. 5. The radial overhang of the free end of the first sealing lip 22 beyond the supporting portion 24 is shown at the length designation 34. The overall length of the first sealing lip 22 is shown at the designation 36, measured in each case in the radial direction. Here, the length 34 is approximately one third of the length 36. The length 34 acts as an active length for a sealing action when a system pressure acts along the arrow 38 (that is to say, toward the top in FIG. 19), whereas the greater length 36 acts as an active length for the sealing action in the opposite direction along the arrow 40 (that is to say, toward the bottom in FIG. 19). FIG. 20 illustrates the shorter annular region which is denoted by way of the length 34 in FIG. 19 in a hatched manner at the designation 44. The annular region which is denoted by way of the length 36 in FIG. 19 is illustrated in a hatched manner at the designation 42 in FIG. 21.

LIST OF DESIGNATIONS

10 Valve element
12 Aperture
14 Bearing journal
16 Seal arrangement
16' Seal arrangement
18 Carrier element
18' Carrier element
20 Sealing element
20' Sealing element
22 First sealing lip
22' First sealing lip
24 Second sealing lip
24' Second sealing lip
26 Supporting portion
26' Supporting portion
28 Housing
28' Housing
30 Latching protrusion
30' Latching protrusion
32 Latching receptacle
32' Latching receptacle
34 Radial overhang
36 Overall length
38 Arrow
40 Arrow
42 Annular region
44 Annular region

The invention claimed is:

1. A coolant valve for a vehicle, comprising a housing having a plurality of coolant ports, and a spherical-shell-shaped or hemispherical-shell-shaped valve element mounted in a rotatable manner in the housing in order to connect or disconnect coolant ports, and at least one seal arrangement arranged in the region of at least one coolant port, said seal arrangement bearing in a sealing manner against the housing on one side and in a sealing manner against the valve element on the other side, wherein the seal arrangement has an annular carrier element made of a first material and an annular sealing element made of a second material, the second material being softer than the first material, wherein the annular sealing element is connected to and carried by the annular carrier element, wherein the annular sealing element has a first annular sealing lip bearing against the valve element and the annular carrier element has an annular supporting portion adjacent the first annular sealing lip, the first annular sealing lip protruding radially inward beyond a radially inner edge of the annular supporting portion such that a radially inward free end portion of the first sealing lip is exposed beyond the radially inner edge of the annular supporting portion, wherein the radially inward free end portion flexes away from the annular supporting portion as the radially inward free end portion bears against the valve element, and part of the first annular sealing lip being pressed against the annular supporting portion when coolant flows through the coolant valve, wherein the part is located radially outward of the radially inner free end portion, wherein the annular carrier element has a latching portion by which the annular carrier element is latched to the housing, wherein the latching portion has at least one latching protrusion and/or at least one latching receptacle, and wherein the housing has at least one corresponding latching receptacle and/or at least one corresponding latching protrusion.

2. The coolant valve as claimed in claim 1, wherein the part of the first annular sealing lip is lifted at least partially from the annular supporting portion when coolant is not flowing through the coolant valve.

3. The coolant valve as claimed in claim 1, wherein the annular sealing element has a second sealing lip bearing against the housing.

4. The coolant valve as claimed in claim 3, wherein the second sealing lip is configured in an annular manner.

5. The coolant valve as claimed in claim 1, wherein a ratio of a radial length of the radially inward free end portion of the first annular sealing lip to an overall radial length of the first annular sealing lip is at most 0.4.

6. The coolant valve as claimed in claim 1, wherein the latching portion has a thickness that runs in a direction of an axis of the seal arrangement, wherein the latching receptacle defines a recess that receives the latching portion, wherein a dimension of the recess that runs in the direction of the axis of the seal arrangement is larger than the thickness such that the latching portion has a clearance, relative to the recess, to enable some movement of the latching portion in the direction of the axis of the seal arrangement.

7. The coolant valve as claimed in claim 1, wherein the seal arrangement is produced in a two-component injection-molding process.

8. A coolant circuit of a vehicle, comprising a plurality of coolant lines and at least one coolant valve, arranged in the coolant circuit, as claimed in claim 1, the coolant ports of said coolant valve being connected to the coolant lines.

9. A vehicle comprising a coolant circuit as claimed in claim 8.

* * * * *